J. A. GERWEN.
IDLER PULLEY STRUCTURE.
APPLICATION FILED DEC. 12, 1918
1,300,833.
Patented Apr. 15, 1919.
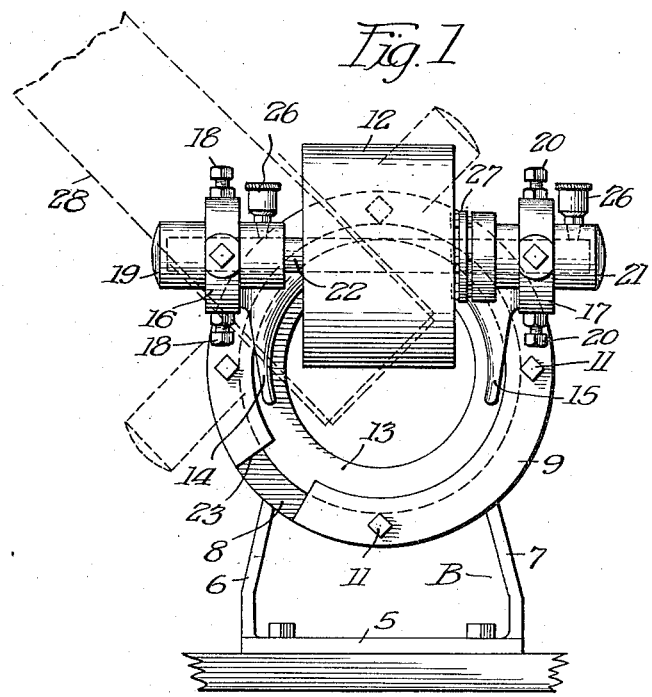
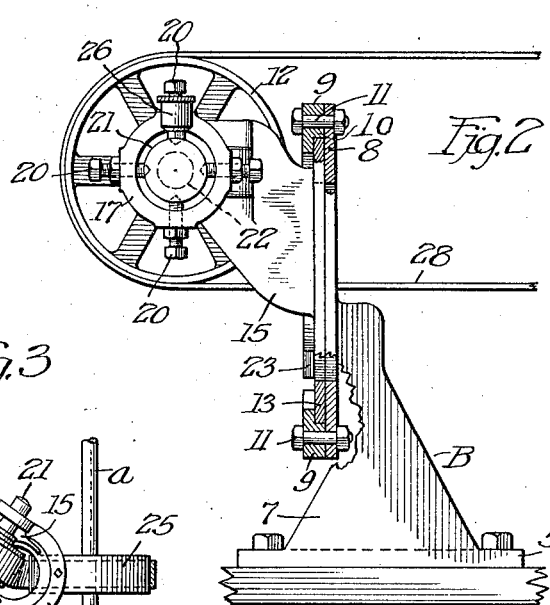
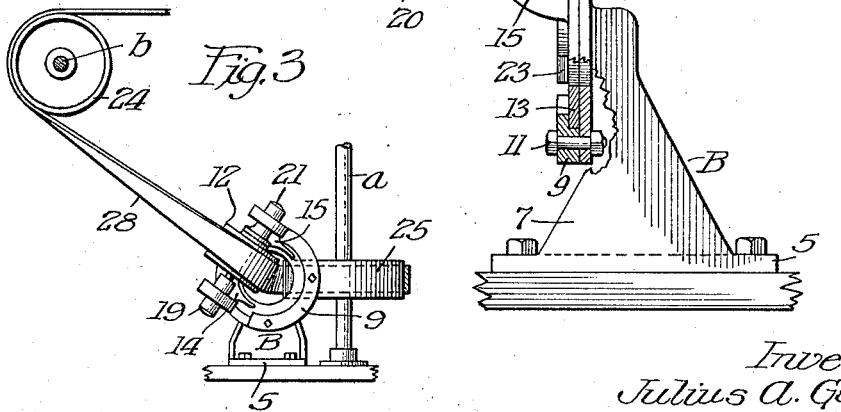
Inventor
Julius A. Gerwen
By James R. Offield
Atty

UNITED STATES PATENT OFFICE.

JULIUS A. GERWEN, OF MOLINE, ILLINOIS, ASSIGNOR TO MOLINE MILL MANUFACTURING COMPANY, OF MOLINE, ILLINOIS, A CORPORATION OF DELAWARE.

IDLER-PULLEY STRUCTURE.

1,300,833.  Specification of Letters Patent.  Patented Apr. 15, 1919.

Application filed December 12, 1918. Serial No. 266,401.

*To all whom it may concern:*

Be it known that I, JULIUS A. GERWEN, a subject of Germany, and a resident of Moline, in the county of Rock Island and State of Illinois, have invented certain new and useful Improvements in Idler-Pulley Structures, of which the following is a specification.

My invention relates to idler pulley structures and covers improved construction and arrangement whereby a pulley wheel may be adjusted through a wide range for directing and guiding the driving belt connecting pulleys on shafts between which power is to be transmitted.

One of the objects of my invention is to provide such construction and arrangement that the pulley wheel can be rotated bodily through a complete circle and with the center of its face always in the axial line around which the pulley is bodily adjusted.

Another object of the invention is to provide simple and inexpensive construction which will enable adjustment to be readily made at any time.

On the accompanying drawing I have shown a construction embodying the various features of my invention, and on this drawing Figure 1 is a front elevational view of a pulley structure, Fig. 2 shows a side elevational view thereof partly in vertical diametral section, and Fig. 3 shows one adaptation of the pulley structure.

The supporting base B for the pulley structure comprises the base plate 5 and the side standards or legs 6 and 7. At their outer ends these legs support the flat annular frame 8. In practice the parts just described can form part of an integral casting. To coöperate with the frame 8 the ring 9 is provided having the internal flange 10, bolts 11 being used to detachably secure the ring to the frame.

Supporting base for the pulley wheel 12 comprises the flat annular plate 13 from which extend brackets 14 and 15 terminating in circular sleeves 16 and 17. By means of set screws 18 a journal box 19 is alined in the sleeve 16, and by means of set screws 20 the journal box 21 is alined in the sleeve 17. In these journal boxes is journaled the shaft 22 on which is mounted the pulley wheel 12. The annular plate 13 is held against the annular frame 8 concentric therewith by the clamping ring 9 and its flange 10, the inner diameter of the plate 13 being preferably the same as that of the frame 8. By means of the set screws the journal boxes are so set in the supporting sleeves that the pulley axis will be parallel with the frame 8 and at right angles to the axial line of this frame, and the outer diameter of the pulley at its central plane is equal to the distance between the pulley axis and the axial line of the frame 8 so that when the plate 13 is turned on the frame 8 the center of the pulley face will always be coincident with the axial line of the frame 8. While loosening the bolts 11 the plate 13 can be readily rotated to set the pulley at the desired angle and this angle will be rigidly maintained when the bolts are tightened. Where the pulley and its supporting base is so large that a continuous clamping ring cannot be slipped thereover, the clamping ring is preferably split or has a section cut out therefrom to leave a gap 23 which will permit the ring to be applied.

In Fig. 3 I show my improved pulley structure associated with a vertical shaft *a* from which power is to be transmitted to the shaft *b* at an angle therewith, the pulley 24 on the latter shaft being above the pulley 25 on the shaft *a*. The idler pulley structure is supported with the axial line of the frame 8 passing through the center plane of the pulley 25 and the belt 26 passes from the pulley 25 around the idler pulley wheel 12 and then to the pulley 24 on shaft *b*. By swiveling the plate 13 in the frame 8 the idler pulley wheel can be accurately set with reference to the pulley 24 and the center line of the idler pulley will always be in the axial line of the frame 8 so that the belt will always be accurately guided and directed. By adjusting the idler pulley structure to the proper angle the transmitting belt will always be properly guided and directed to transmit power to or from the shaft *a* from or to a shaft *b* which may be at any angle to the shaft *a* or at any distance above or below the pulley on shaft *a*. The adjustment of the idler pulley can be through a complete circle, and the belt can be directed from any side or angle from a driving to a driven pulley.

In order to properly lubricate the pulley wheel on shaft 22 oil cups 26 are provided and at the inner end of one of the journal boxes (journal box 21 on the drawing) a stuffing box 27 is applied. When adjustment is made the journal provided with the stuffing box should be at the upper end of the shaft to prevent the outflow of lubricating oil from the journal box.

I do not of course desire to be limited to the exact construction and arrangement shown and described as changes and modifications are no doubt possible which would still come within the scope of the invention.

I claim as follows:

1. In an idler pulley structure, the combination of an annular supporting frame, a flat annular supporting plate, a clamping ring detachably secured to said frame and receiving said plate to hold said plate and frame in axial alinement, bearing arms extending from said plate, a shaft journaled at the ends of said arms, and a pulley wheel on said shaft, said shaft being at right angles to the axial line of said plate and frame.

2. In an idler pulley structure, the combination of a supporting frame, a pulley wheel, a supporting base for said pulley wheel, means affording swivel connection between said base and frame, said base and frame having a passageway therethrough for the passage of a belt engaging said pulley wheel.

3. In an idler pulley structure, the combination of a flat annular frame, an annular plate, a clamping ring for holding said plate and frame concentric and for permitting rotation of said plate relative to said frame through a complete circle, arms extending from said plate, a shaft journaled in said arms at right angles to the axial line of said plate and frame, and a pulley wheel on said shaft, the radius of said pulley wheel being such that the center of the pulley face will always be coincident with the axial line of said plate and frame.

4. In an idler pulley structure, the combination of a supporting base, a flat annular frame forming part of said base, an idler pulley wheel, a shaft therefor, a supporting frame for said shaft comprising a flat annular plate and arms extending therefrom in which said shaft is journaled, and a clamping ring for supporting said plate on said frame concentric therewith, means for securing said clamping ring to said frame, said ring when loosened permitting said plate and the pulley supported therefrom to be rotated through three hundred sixty degrees in either direction, the center of the pulley face being coincident with the axial line of said plate and frame.

5. In an idler pulley structure, the combination of an annular supporting frame, a supporting plate swiveled on said frame for complete turn thereon, means for securing said plate in any adjusted position on said frame, a shaft supported on said plate at right angles with the axis of rotation of the plate, and a pulley on said shaft.

6. In an idler pulley structure, the combination of an annular supporting frame, a supporting plate swiveled on said frame for complete turn thereon, means for securing said plate in any adjusted position on said frame, a shaft supported on said plate at right angles with the axis of rotation of the plate, and a pulley on said shaft, the diameter of the pulley being such that the center of the pulley face will at all times coincide with the axial line of said supporting plate.

In witness whereof, I hereunto subscribe my name this 2nd day of December, A. D. 1918.

JULIUS A. GERWEN.

Copies of this patent may be obtained for five cents each, by addressing the "Commissioner of Patents, Washington, D. C."